United States Patent
Lindo et al.

(10) Patent No.: US 9,916,442 B2
(45) Date of Patent: Mar. 13, 2018

(54) REAL-TIME RECORDING AND MONITORING OF MOBILE APPLICATIONS

(71) Applicants: Jonathan Lindo, Santa Clara, CA (US); Vamsee Lakamsani, Livermore, CA (US); Vikas Krishna, San Jose, CA (US); Nagi Prabhu, Saratoga, CA (US)

(72) Inventors: Jonathan Lindo, Santa Clara, CA (US); Vamsee Lakamsani, Livermore, CA (US); Vikas Krishna, San Jose, CA (US); Nagi Prabhu, Saratoga, CA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/267,240

(22) Filed: May 1, 2014

(65) Prior Publication Data
US 2015/0242623 A1    Aug. 27, 2015

Related U.S. Application Data

(60) Provisional application No. 61/944,970, filed on Feb. 26, 2014.

(51) Int. Cl.
*G06F 21/00* (2013.01)
*G06F 21/55* (2013.01)

(52) U.S. Cl.
CPC .... *G06F 21/552* (2013.01); *G06F 2221/2115* (2013.01)

(58) Field of Classification Search
CPC . H04L 63/14; H04L 63/1408; H04L 63/1433; H04L 63/1441; H04L 63/1483; H04L 63/1416; H04L 63/1425; H04L 63/145; H04L 63/1466; G06F 21/55; G06F 21/552; G06F 21/554; G06F 21/566; G06F 2221/033; G06F 11/3003; G06F 11/0781;
(Continued)

(56) References Cited

U.S. PATENT DOCUMENTS

| 2006/0259899 A1* | 11/2006 | Cooper ............... G06F 11/362 717/127 |
| 2008/0195369 A1* | 8/2008 | Duyanovich ....... G06F 11/0709 703/22 |
| 2010/0017879 A1* | 1/2010 | Kuegler et al. ................ 726/23 |

(Continued)

OTHER PUBLICATIONS

By Stephen Skidmore, "SDK and App Wrapping for Mobile Application Management", APPERIAN—Mobile App Management, Apr. 10, 2013.*

Primary Examiner — Edward Zee
Assistant Examiner — Chi Nguy
(74) *Attorney, Agent, or Firm* — Baker Botts L.L.P.

(57) ABSTRACT

Systems and methods may include monitoring data input to and output from an application on a mobile device. Such systems and methods may include storing meta-data, which describes a behavior of the data input to and output from the application, on the mobile device. Such systems and methods may include determining whether a behavior of the application is anomalous based on the meta-data stored on the mobile device. Such systems and methods may include providing detailed data, which includes the data input to and output from the application, to another device in response to determining that the behavior of the application is anomalous based on the meta-data stored on the mobile device.

20 Claims, 3 Drawing Sheets

(58) Field of Classification Search
CPC . G06F 11/0793; G06F 2201/86; G06F 21/577
USPC ..................................................... 726/22–25
See application file for complete search history.

(56) References Cited

U.S. PATENT DOCUMENTS

| | | | |
|---|---|---|---|
| 2011/0047597 A1* | 2/2011 | Mahaffey | G06F 21/564 |
| | | | 726/3 |
| 2012/0036498 A1* | 2/2012 | Akirekadu | G06F 11/3495 |
| | | | 717/124 |
| 2012/0198569 A1* | 8/2012 | Halas | 726/30 |
| 2014/0113588 A1* | 4/2014 | Chekina | G06F 21/552 |
| | | | 455/410 |
| 2014/0150100 A1* | 5/2014 | Gupta | G06F 21/316 |
| | | | 726/22 |
| 2014/0245450 A1* | 8/2014 | Oberheide et al. | 726/25 |
| 2014/0351810 A1* | 11/2014 | Pratt | G06F 9/45545 |
| | | | 718/1 |

* cited by examiner

REAL-TIME RECORDING AND MONITORING OF MOBILE APPLICATIONS

CROSS-REFERENCE TO RELATED APPLICATION

This application claims the benefit of U.S. Provisional Application No. 61/944,970, filed Feb. 26, 2014, the disclosure of which is incorporated herein by reference.

BACKGROUND

The present disclosure relates to mobile applications and, more specifically, to a system and method for real-time recording and monitoring of mobile applications.

As mobile devices continue to proliferate and increasingly become the primary computing device for the majority of knowledge workers, an increasing amount of work and digital interactions occur via mobile devices. These devices may be personal or corporate-liable, and most frequently contain a mix of personal and corporate resources, such as applications, documents, email and data.

BRIEF SUMMARY

According to an aspect of the present disclosure, systems and methods may include monitoring data input to and output from an application on a mobile device. Such systems and methods may include storing meta-data, which describes a behavior of the data input to and output from the application, on the mobile device. Such systems and methods may include determining whether a behavior of the application is anomalous based on the meta-data stored on the mobile device. Such systems and methods may include providing detailed data, which includes the data input to and output from the application, to another device in response to determining that the behavior of the application is anomalous based on the meta-data stored on the mobile device.

Other features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to security management, compliance, and support in cloud computing and mobile applications, systems and methods disclosed herein may also be related to other areas beyond cloud computing and mobile applications. Systems and methods disclosed herein may be applicable to a broad range of applications that require security, compliance and/or support and that are associated with various disciplines, such as, for example, research activities (e.g., research and design, development, collaboration), commercial activities (e.g., sales, advertising, financial evaluation and modeling, inventory control), IT systems (e.g., establishing access privileges, compliance programs, and/or support mechanisms for computing systems, establishing user rights and roles, document management, resource-management, cloud computing, network access, security, service provisioning), and other activities of importance to a user or organization.

As mobile devices continue to proliferate and increasingly become the primary computing device for the majority of knowledge workers, an increasing amount of work and digital interactions occur via mobile devices. These devices may be personal or corporate-owned, and most frequently contain a mix of personal and corporate resources, such as applications, documents, email and data.

In the same way that IT and security organizations today have a need to monitor and control access to corporate resources from devices such as servers, desktops, and laptops, this need is more complex in the context of mobile devices. Reasons for this include the fact that mobile devices may not be under the control of the organization, may be accessed from any physical location, may originate from any network, and may be exposed to additional threats such as malware and viruses due to the fact that these devices are frequently mixed-use devices serving both personal and corporate functions. Consequently, organizations need to be able to monitor, govern, audit, and control access to corporate resources from mobile computing devices in addition to traditional network devices, such as servers, desktops, and laptops.

Systems and methods disclosed herein may address these and other problems by providing one or more technologies that may be applied to a mobile computing resource, such as mobile applications, documents, e-mails, and/or other data, which may enable the monitoring and reporting of behavior on a mobile device for the purposes of real-time analysis, alerting, and control.

Systems and methods disclosed herein may provide a dynamic real-time security and behavior analysis engine (the "Engine") and may inject the Engine into any mobile application using a software development kit ("SDK") or an app wrapping technique, which may not require any source code changes or developer participation. Via these methods, application-analysis instrumentation may be achieved by introducing the Engine into an existing application.

The Engine, once injected into the mobile app via some injection instrumentation, may monitor, record, and analyze data from the mobile app or the mobile device itself in real-time during the execution of the mobile app to determine if any behavior or activity should be captured, recorded, or flagged for later inspection in more detail. Observations of user-input, network activity, application behavior, thread, CPU, and memory usage alone or in combination may contribute to a determination to collect additional data or less data.

Data captured by the analysis engine may be processed locally on the device upon which the data was captured, or transferred via a network to a processing engine in a cloud or data-center where aggregated analysis of the captured data from many Engine data-sources running on many devices may be collected and analyzed. Aggregated data collected and stored on servers running in a cloud or data-center may be used to determine "nominal" (e.g., baseline) behavior of an application, establishing a baseline against which specific app behavior may be compared, and anomalies or unexpected behavior may be detected, alerted upon, notified to an administrator and/or another device, and/or used to establish a risk profile and/or a score of an application's behavior.

This data may be used to detect risky and/or undesirable user and/or device behavior, risky and/or undesirable app behavior, and/or app behavior which may indicate the presence of software issues, such as bugs. Such risky and/or undesirable behavior may expose sensitive corporate resources to viruses, malware, and/or unauthorized users/systems, for example.

Configurations of systems and methods disclosed herein may provide instrumentation that may be applied to any mobile application and may enable capture of the complete end-user experience including both input and output to and from any mobile app. Certain example configurations of such systems and methods are described below.

Security Forensics with Instrumentation. This data may be used to perform both manual and automated security analysis of end-user behavior, data payload inspection for data flowing to/from the network and/or a physical medium such as the device storage, and/or visual output to the screen of the device. Analysis may be powered by a heuristics engine which may search for patterns in data flows, user behavior, and/or visual output to detect anomalies and/or recorded patterns potentially of interest and/or requiring further analysis.

Enhanced Support with User Experience Playback. In the case of an error or issue, such as an application crash, the complete set of data and/or events leading up to the issue would have been recorded in such configurations. This recorded data may be used to analyze and determine the root cause of an issue or error the end-user may have experienced. When combined with other collected data, such as a crash report, device profile information, and/or device state information, the sequence of events leading to the issue may accelerate the understanding and resolution of a potential application support issue.

Real-time Security and Compliance Monitoring of Mobile Apps. This data may be analyzed on the device and/or periodically transmitted to a back-end service for further analysis to determine if further investigation of a security and/or compliance issue is warranted. In such a case, additional data capture may be remotely enabled automatically to expand the level of available information for future analysis. Analysis may be powered by a heuristics engine which may search for patterns in data flows, user behavior, and/or visual output to detect anomalies and/or recorded patterns potentially of interest and/or requiring further analysis.

A system disclosed herein may utilize mobile application or device activity, usage patterns, and community models to determine if the mobile application or device is compromised. In some embodiments?, such processes may be implemented by a processor executing computer-readable instructions or similar configurations, as disclosed herein. In particular configurations, the processor or equivalent device may function as a plurality of device, including, for example, a learning device, an analysis device (e.g., a risk analysis device), and an enforcement device.

In particular configurations, information about each resource access by a mobile device or mobile application may be logged and maintained in a memory. Accordingly, a history of activity for the mobile device or mobile application may be generated. In some configurations, the history of activity may provide a baseline to work from and to perform analysis. The history of identity activity may comprise a history of access of one or more resources by the device or application. In some configurations, the history of access of the one or more resources by the device or application may indicate that the identity has not accessed one or more resources (e.g., information explicitly indicating that a particular resource has not been accessed by the device or application; no information indicating that the device or application has accessed a particular resource, which may implicitly indicate that the device or application has not accessed the particular resource).

In some configurations, an aging function may be applied to one or more histories of device or application activity, and expired information (e.g., older information, stale information, non-recent information, non-current information, information recorded outside of a predetermined period of time or prior to a particular date or time, information related to access events that occurred outside of a predetermined period of time or prior to a particular date or time, information about the device or application that is no longer current) may be updated or removed from the history of device or application activity. In certain configurations, the aging function may remove a resource from an access list for a particular device or application if the particular device or application has not accessed the resource within a specified period of time. In some configurations, such an aging function or a similar function may be performed as part of one or more of a learning component (e.g., as part of one or more of a history function), an analysis component, and an enforcement component.

In particular configurations, an analysis component may determine if access to a resource (e.g., a file, an application, a document, a location, a folder, information, an account, a device, a service) or use of the resource by a device or application is anomalous (e.g., outside the scope of normal behavior, unexpected, unusual), such as, for example, when a device or application requesting a resource has never accessed the resource before. The analysis component may take into account the history of the device or application to determine a degree of risk (e.g., risk level) associated with the device or application accessing the resource. This also may be based on a comparison with a baseline. Further, the analysis component may take into account one or more of a sensitivity and an importance of the resource when determining the degree of risk associated with the device or application accessing the resource.

In particular configurations, the enforcement component may utilize information from the analysis component to determine if the device or application should have access to the resource and if such access to the resource should have one or more restrictions placed thereupon. The enforcement component may contain the policy based on one or more of the importance and sensitivity of the resource. In certain configurations or for some resources, the access policy may be specific. For example, the policy may require additional verification operations if a device or application has never accessed the resource. In some configurations, the analysis component may take into account such verification information (e.g., verification data) when determining the degree of risk associated with the identity accessing the resource. In some configurations, the access policy may grant the device or application access, either full or restricted, to the resource. In many configurations, the access of the resource by the device or application may be audited and/or monitored with enhanced monitoring methods, and, in some configurations, such access may be suspended or prohibited in the future.

The systems and methods disclosed herein provide many unique advantages. In particular configurations of the systems and methods disclosed herein, it may be possible to add an additional level of security to an environment. Moreover, even if configured for use as an audit tool, without an enforcement component, the systems and methods disclosed herein may allow for the identification of potentially malicious activity without degrading performance to a user noticeable degree. The systems and methods disclosed herein also may allow for generation and analysis of real usage patterns that may be utilized to create an accurate or improved behavior model for mobile devices and applications, which may be utilized to more effectively assign static access rights.

Figure 1:
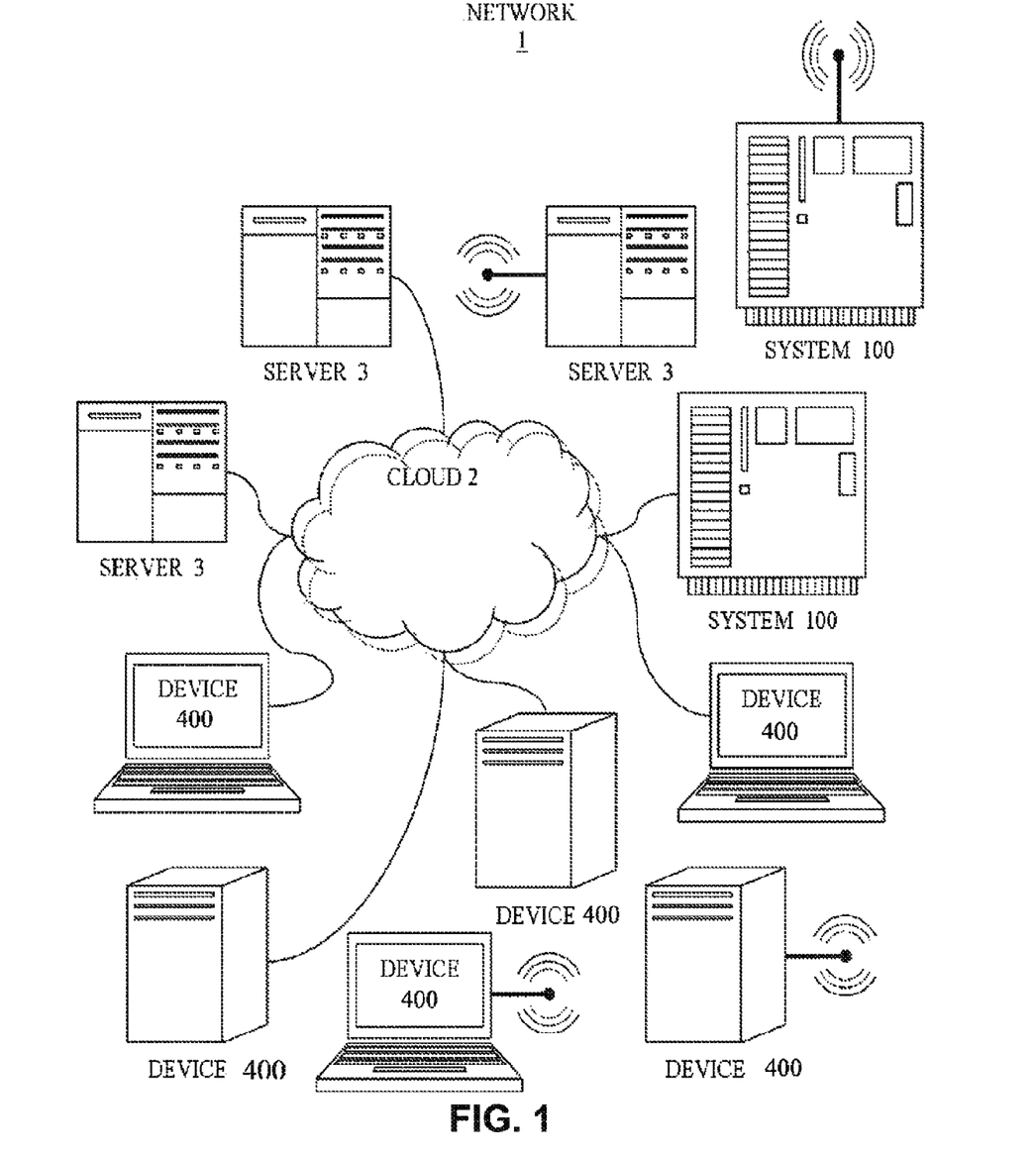
FIG. 1 is a schematic representation of a network 1 on which systems and methods for real-time recording and monitoring of mobile applications may be implemented.

Referring now to FIG. 1, a network 1 comprising a plurality of resources now is disclosed. Network 1 may comprise one or more clouds 2, which may be public clouds, private clouds, or community clouds. Portions of network 1 may be a wireless network, such as a Wi-Fi and/or cellular network (e.g., 3G, 4G, LTE), and other portions may be wired. Each cloud 2 may permit the exchange of information, services, and other resources between various identities that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications between identities and may permit identities to access various resources of network 1.

Network 1 may comprise one or more servers 3 that may at least store resources thereon, host resources thereon, or otherwise make resources available for certain identities. Such resources may comprise, but are not limited to, information technology services, financial services, business services, access services, other resource-provisioning services, secured files and information, unsecured files and information, accounts, and other resources desired by one or more entities. In some configurations, for example, one or more server 3 may even provide a service of granting access to a particular location (e.g., functioning as a lock or other physical access-restricting mechanism). More generally, servers 3 may comprise, for example, one or more of general purpose computing devices, specialized computing devices, mainframe devices, wired devices, wireless devices, and other devices configured to provide resources to consumers.

Network 1 may comprise one or more devices 400, which may enable access to certain resources via one or more servers 3, which, in some configurations, may connect to the one or more devices 400 via cloud 2 or via other network routes. Devices 400 may comprise, for example, one or more of general purpose computing devices, specialized computing devices, mobile devices (e.g., iPhones, iPads, smart phones, basic phones, tablet computers), wired devices, wireless devices, passive devices, routers, switches, and other devices utilized by consumers of provided services. In certain configurations, a device 400 may be configured to perform the same functions as a server 3 in addition to the functions of a device 400 set forth above, a server 3 may be configured to perform the same functions as a device 400 in addition to the functions of a server 3 set forth above, and it may not be necessary to access resources via network 1 or cloud 2 (e.g., a system comprising an input device, such as a keyboard or mouse, performing the functionality of device 400 and a general purpose computer performing the functionality of server 3).

Moreover, network 1 may comprise one or more systems 100 that may monitor requests to access resources (e.g., a request from a device 3 to access a resource via a server 400) and may collect information about resource access. In certain configurations, such information may comprise, for example, one or more of information about requests for access to resources or accessing a resource, time or date information associated with accessing or requesting access to the resource, frequency information associated with accessing or requesting access to the resource, a quantity of requests to access the resource, a number of times the resource has been accessed, a number of times access to the resource has been prohibited or restricted or a frequency thereof, information about the resource such as importance or sensitivity. System 100 may receive aggregated data from a plurality of devices 400 and/or servers 3 and/or transmit data back to such devices. System 100 may even distribute instructions for controlling and/or implementing monitoring processes to devices 400 and/or servers 3. Further, system 100 may function as an analysis component and may analyze the data received thereby. For example, system 100 may determine a degree of risk associated with one or more of requests to access resources, one or more devices 400 and/or servers 3, and/or applications running thereon. Moreover, in certain configurations, system 100 may function as an enforcement device, as described above, and determine and/or implement an access policy for certain devices 400 and/or servers 3, may actively notify administrators of detected issues and/or events, or may even dynamically repair anomalies in devices 400, servers 3, and/or applications executed thereon. In some configurations, system 100 may provide the access policy to server 3, such that server 3 may enforce the access policy. In other configurations, system 100 may enforce the access policy itself. System 100 may be, for example, one or more of a general purpose computing device, a specialized computing device, a wired device, a wireless device, and any other device configured monitor and analyze information. In some configurations, system 100 may even be a mobile device.

System 100 may connect to cloud 2 and monitor and/or communicate with servers 3 and devices 400. By monitoring and/or communicating with servers 3 and devices 400, system 100 may obtain rich datasets regarding many devices 400, many applications, many resources, and the utilization and access of such resources by such applications and devices 400. System 100 may utilize these data sets to analyze the behavior of devices 400 and applications thereon, and may generate enforcement policies, feedback, and/or other data for devices 400 when anomalies are discovered. In this manner, system 100 may provide functionality related to real-time recording, monitoring, and analysis of mobile devices and mobile applications.

In some configurations, one or more of a server 3 and a device 400 may comprise system 100. Accordingly, system 100 may be an integral component of the one or more of server 3 and device 400 and may connect directly thereto, rather than via cloud 2 or another network connection. In other configurations, system 100 may be separate from servers 3 and devices 400.

Figure 2:
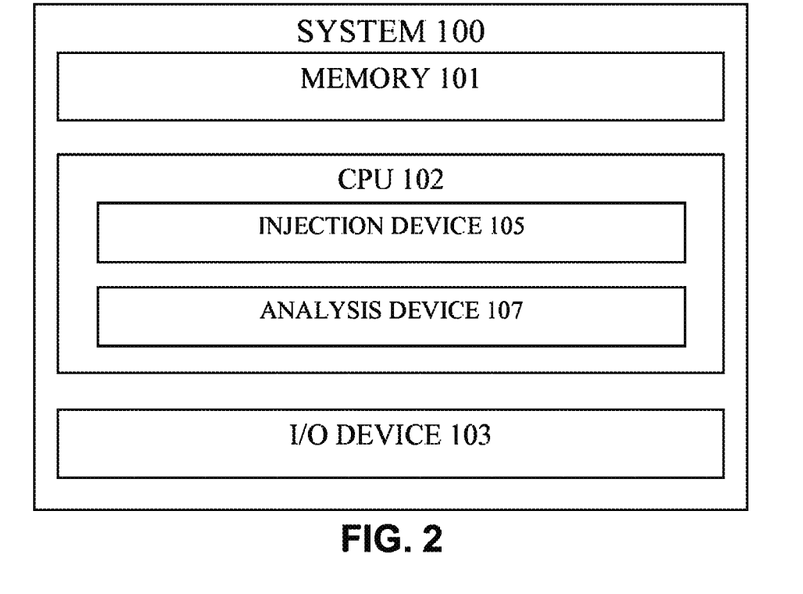
FIG. 2 is a schematic representation of a system configured to inject a dynamic real-time security and behavior analysis engine into a mobile application and to analyze data received from the engine.

Referring now to FIG. 2, a schematic representation of a system configured to inject a dynamic real-time security and behavior analysis engine into a mobile application and to analyze data received from the engine is depicted and described. In the illustrated schematic representation a system (such as system 100 of FIG. 1), may comprise a memory 101, a CPU 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more of an injection device 105 and an analysis device 107. In particular configurations, injection device 105 and analysis device 107 may be implemented on different CPUs, on different systems 100, or even on one or more servers 3 and/or one or more devices 400. In some configurations, system 100 may not comprise one or more of injection device 105 and analysis device 107. I/O device 103 may transmit data to cloud 2, may transmit data to other devices connected to system 100, and may transmit a notification (e.g., display a message, make a sound, send an email, make a telephone call) to a user (e.g., an identity). Further, I/O device 103 may implement one or more of wireless and wired communication between system 100 and other devices, such as devices 400 and/or servers 3.

Figure 3:
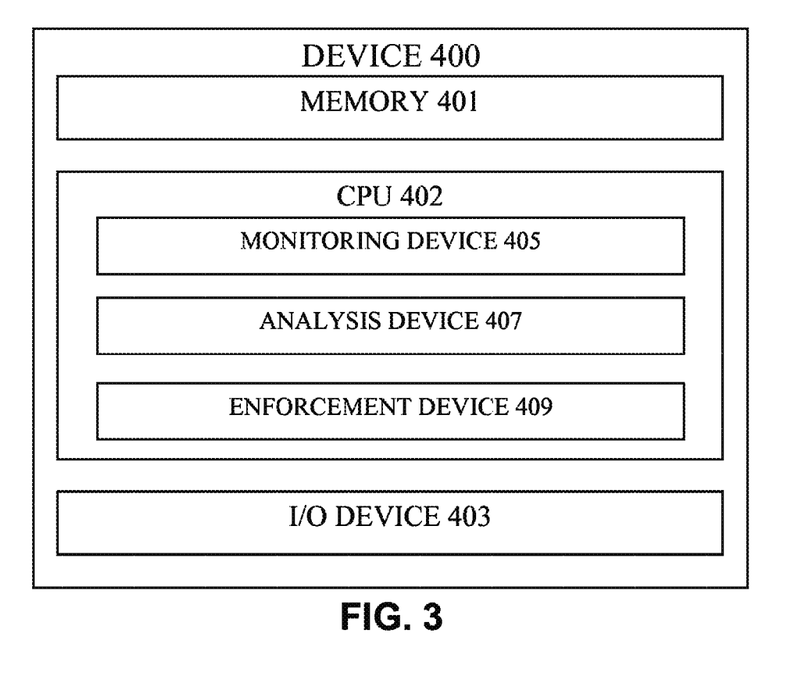
FIG. 3 is a schematic representation of a system configured to implement the processes of the dynamic real-time security and behavior analysis engine.

Referring now to FIG. 3, a schematic representation of a system configured to implement the processes of the dynamic real-time security and behavior analysis engine is depicted and described. In the illustrated schematic representation a device (such as device 400 of FIG. 1), may comprise a memory 401, a CPU 402, and an I/O device 403. Memory 401 may store computer-readable instructions that may instruct device 400 to perform certain processes. The computer-readable instructions may include, for example, software code for a mobile application and/or software code for the Engine (e.g., a dynamic real-time security and behavior analysis engine), which may have been injected into the code of a mobile application or injected and installed onto the mobile device through a technique of encapsulating a mobile application. In particular, when executed by CPU 402, the computer-readable instructions stored in memory 401 may instruct CPU 402 to operate as one or more of a monitoring device 405, an analysis device 407, and an enforcement device 409. Monitoring device 405 and analysis device 407 may enable device 400 to monitor and analyze the activity and behavior of device 400 and the applications installed thereon, and enforcement device 409 may enable device 400 to address abnormalities and anomalies in security, compliance, or operation identified through the monitoring and analysis of such activity and behavior. In particular configurations, monitoring device 405, analysis device 407, and enforcement device 409 may be implemented on different CPUs, on different devices 400, or even on one or more servers 3 and/or one or more systems 100. In some configurations, device 400 may not comprise one or more of monitoring device 405, analysis device 407, and enforcement device 409. Moreover, the processes performed by monitoring device 405, analysis device 407, and enforcement device 409 may be integrated into and/or concealed by the processes of a mobile application. I/O device 403 may transmit data to cloud 2, may transmit data to other devices connected to device 400, and may transmit a notification (e.g., display a message, make a sound, send an email, make a telephone call) to a user. Further, I/O device 403 may implement one or more of wireless and wired communication between device 400 and other devices, such as systems 100 and/or servers 3.

Figures 4, 5:
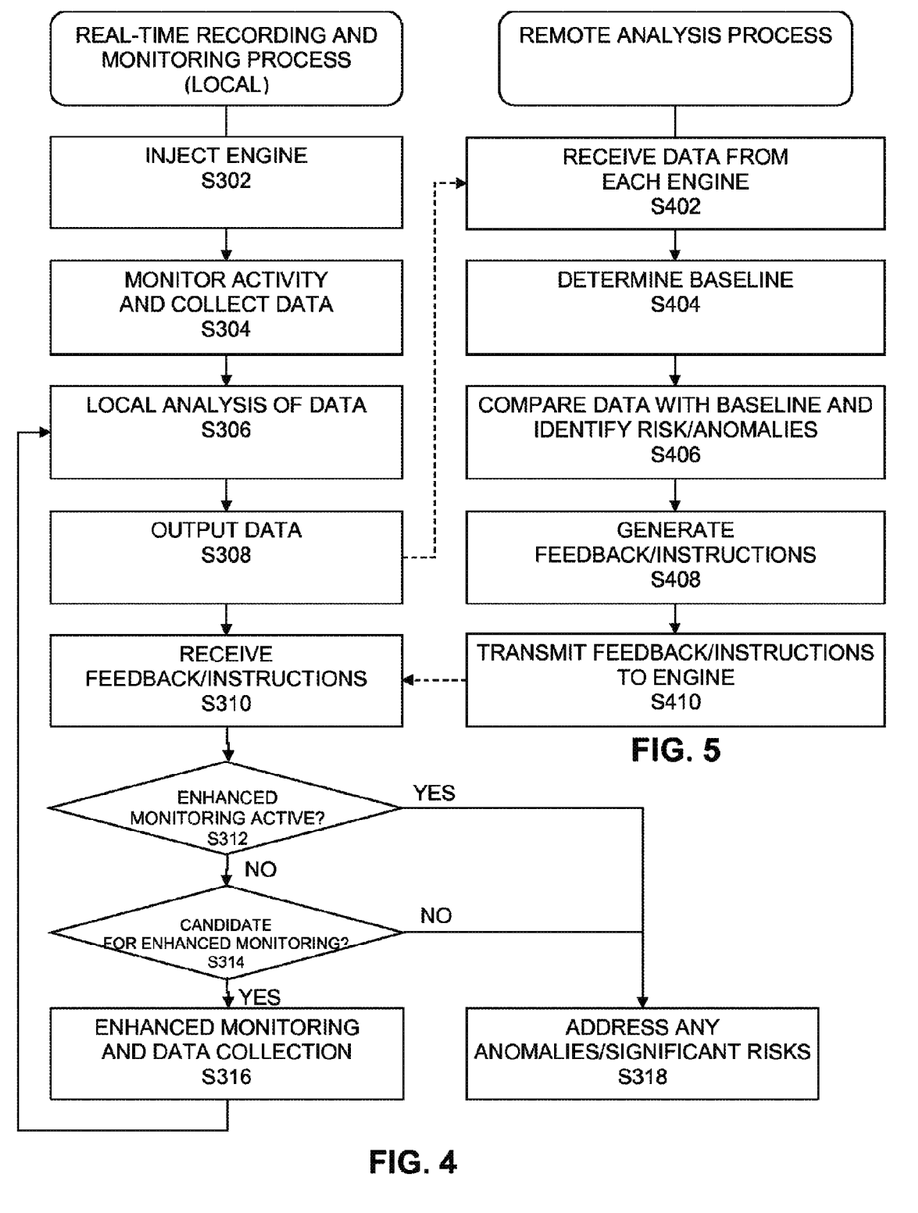
FIG. 4 illustrates a process of real-time recording and monitoring of mobile applications.
FIG. 5 illustrates a process of analyzing data from mobile applications.

Referring to FIG. 4, a process for real-time recording and monitoring of a mobile device and/or applications used by the mobile device (e.g., applications installed thereon or accessed by the mobile device through a cloud-based service) now is described. In S302, injection device 105, or a similar device, may inject the Engine (e.g., a dynamic real-time security and behavior analysis engine) into a mobile application using an SDK or an app wrapping technique, which may not require any source code changes or developer participation. The mobile application may be installed on and/or accessed through a device 400. Consequently, the device 400 may execute computer-readable instructions associated with the Engine, which may control device 400 to perform certain processes, such as those of S304, S306, S308, S310, S312, S314, S316, and S318, for example.

In S304, monitoring device 405 may monitor the activity of the particular application into which the Engine was injected, other applications utilized by device 400, and/or device 400 itself. For example, monitoring device 405 may monitor all data input and output from and/or utilized by the monitored application or device, including but not limited to user-input, network activity, application behavior, thread, CPU, and memory usage alone or in combination. Monitoring device 405 may collect and store statistics and other meta-data about this monitored data (or the monitored data itself) locally in memory 401, for example.

In S306, analysis device 407 may analyze the locally stored statistics and other meta-data. Specifically, analysis device 407 may look for trends in the monitored data that indicate unusual behavior or activity. Such anomalies or abnormalities may be determined by comparing the monitored data to predetermined baselines or expected behavior. For example, analysis device 407 may determine that an anomaly may exist if the processor of the mobile device has a high utilization for a sustained period of time or if a particular application transmits and/or receives an amount of data that is significantly higher (e.g., 30% higher) than a predetermined baseline.

In S308, device 400 may utilize I/O device 403 to transmit data collected and stored in S304, or even analysis results determined in S306, to another device for further processing and analysis. The other device may be a device with more processing power than device 400, such as system 100, for example.

Referring to FIG. 5, the process of further analyzing the data collected and stored in S304 by system 100 now is described. In S402, I/O device 103 may receive the data transmitted from one or more devices 400 in S308. In S404, analysis device 107 may use the statistics and other meta-data about the monitored data (or the monitored data itself) from a plurality of devices 400 (or a plurality of similar mobile applications) to determine normative (e.g., baseline) behavioral patterns for the monitored devices 400 and/or applications. Such nominal patterns may identify typical or average ranges of CPU utilization or bandwidth/data utilization, for example.

In S406, analysis device 107 may compare the monitored data for individual devices 400 and/or mobile applications with the established baselines to determine if significant deviations exist. When significant deviations from the established baselines are identified, analysis device 107 may determine that an abnormality or anomaly is present. Such anomalies may be the result of a broken device, a bug in an application, a security breach, a virus, malware, unauthorized use of a device or application, or some type of compliance violation, for example. In some configurations, analysis device 107 may assign a risk score to a device 400 or an application based on its deviation from a baseline level of activity.

In S408, analysis device 107 may utilize the results of the analysis in S406 to generate feedback or further instructions for the Engine on device 400. For example, if analysis device 107 determined that an anomaly or abnormality exists in device 400 or a mobile application, analysis device 107 may generate feedback data that identifies such abnormality or anomaly. In some configurations, the feedback data may include the risk score of device 400 or a mobile application. In certain configurations, analysis device 107 may, in S408, generate instructions for the Engine to initiate enhanced monitoring and data collection processes (described below in more detail) as a result of the determination that an anomaly or abnormality exists in device 400 or a mobile application or that such device 400 or mobile application has been assigned a risk score greater than a predetermined threshold. In particular configurations, analysis device 107 may even generate instructions for the Engine to terminate a process or mobile application or to shut off device 400 if a significant anomaly or abnormality is detected.

In S410, I/O device 103 may transmit the feedback data and any instructions from system 100 to device 400. At this point, the process of further analyzing the data collected and stored in S304 by system 100 may be terminated until additional data is received from a device 400. Returning to FIG. 4, in S310, I/O device 403 may receive any feedback data and instructions transmitted from system 100 in S410.

In S312, analysis device 407 may determine whether an enhanced monitoring and data collection process (described below in more detail) is currently active for device 400 and/or the mobile application associated with the Engine. If the enhanced monitoring and data collection process is already active for device 400 and/or such monitored mobile application (S312: Yes), the process may proceed to S318 (described in more detail below). If the enhanced monitoring process is not active for device 400 and/or such monitored mobile application (S312: No), the process may proceed to S314.

In S314, analysis device 407 may determine whether device 400 and/or the mobile application is a candidate for advanced monitoring. If analysis device 407 determines that device 400 and/or the mobile application is a candidate for advanced monitoring (S314: Yes), the process may proceed to S316. If analysis device 407 determines that device 400 and/or the mobile application is not a candidate for advanced monitoring (S314: No), the process may proceed to S318. Specifically, analysis device 407 may use one or more of the results of the analysis in S306 and the feedback and/or instructions received in S310 to make the determination in S314. For example, analysis device 407 may determine that device 400 and/or the mobile application is a candidate for enhanced monitoring (S314: Yes) in response to determining that an abnormality or anomaly exists in device 400 and/or the mobile application in S306, in response to receiving feedback data in S310 that indicates that an abnormality or anomaly exists in device 400 and/or the mobile application, in response to receiving an instruction to start enhanced monitoring in S310, and/or in response to a risk score of device 400 and/or the mobile application determined in S306 or received in S310 being greater than or equal to a predetermined threshold value. In contrast, for example, analysis device 407 may determine that device 400 and/or the mobile application is not a candidate for enhanced monitoring (S314: No) in response to determining that an abnormality or anomaly does not exist in device 400 and/or the mobile application in S306, in response to receiving feedback data in S310 that indicates that an abnormality or anomaly does not exist in device 400 and/or the mobile application, in response to receiving an instruction not to start enhanced monitoring in S310, and/or in response to a risk score of device 400 and/or the mobile application determined in S306 or received in S310 being less than a predetermined threshold value. In some configurations, the determination in S314 may be based on the type of abnormality or anomaly (e.g., the magnitude of its effects on mobile device 400 or the mobile application, its nature, potential causes thereof, amount of variation from the baseline), rather than simply the presence or absence of such abnormality or anomaly.

Analysis device 407 also may make a default determination in S314 if insufficient information is available. In certain configurations, the default determination in S314 may be negative (S314: No), while in other configurations, the default determination in S314 may be positive (S314: Yes).

In S316, enhanced monitoring may be initiated. Enhanced monitoring may include collecting, storing, and transmitting further data beyond the statistics and meta-data collected and stored in S304. For example, enhanced monitoring may include recording video of all actions taken on device 400 or by the mobile application, recording and storing all data transmitted and/or received by device 400 or by the mobile application, more frequent collection of data, retaining stored data for longer periods of time, deeper inspection of packet data. In some configurations, the amount of data collected during enhanced monitoring may be sufficiently large such that the Engine transmits the monitored data in real-time to an external device, such as system 100, for storage and processing on the fly. Enhanced monitoring may provide more accurate information and a deeper understanding of previously-identified abnormalities, anomalies, and/or risks. In some cases, the enhanced monitoring may help to verify that such anomalies are not significant and may be disregarded. Further, the enhanced monitoring may help identify relationships between sets of anomalies.

After enhanced monitoring has been initiated, the process may return to S306 and, if appropriate, analysis device 407 may analyze the data collected during enhanced monitoring using the methods previously described with respect to S306 and/or using more-detailed analysis techniques. Processes S308, S402, S404, S406, S408, S410, and S310 also may be repeated and/or modified to process the enhanced data in greater detail.

In certain configurations, enforcement device 409 may, in S318, engage in proactive measures to address anomalies, abnormalities, and/or significant risks identified in previous steps. Such proactive measures may include, for example, notifying an administrator, shutting down or deactivating features of device 400 or the mobile application, limiting access to certain resources by device 400 and/or the mobile application, providing an alert or notification to a user, initiating a self-repair or self-healing process, and/or determining a cause of the anomaly based on the monitored, collected, and analyzed information. Accordingly, enforcement device 409 may address lapses in security or compliance and may provide support for malfunctioning devices 400 or bugs in mobile applications. Such proactive solutions may occur based on the nature and magnitude of anomalies and/or the risk score associated with device 400 and/or the mobile application.

In some configurations, the real-time recording and monitoring process shown in FIG. 4 may end after S318. Nevertheless, in other configurations, this process may be repeated continuously, with the process returning to S304 or S306 after S318 has been completed. In particular configurations, the processes of FIGS. 4 and 5 may be initiated at predetermined (or random) intervals, such as hourly or daily, or may be initiated upon request by a user or administrator.

Further, each application running on a device 400 may be associated with a unique Engine in some configurations. In other configurations, the Engine may monitor a plurality of applications.

S306 may be omitted in some configurations, and all of the analysis may be performed by a remote system, such as system 100. In such configurations, data collected by the Engine may not be stored locally on device 400 in S304, but may instead be transmitted in real time to system 100. In other configurations, S308 and S310 may be omitted and all of the analysis may be performed locally by device 400. In such configurations, the analysis may include one or more of processes S404, S406, and S408 in addition to or as part of S306, for example. In certain configurations, S308 and S310 may be performed only after enhanced monitoring has been initiated in S316. Moreover, in some configurations, S306, S404, S406, and S408 may implement heuristic pattern detection that may learn and identify patterns and/or behaviors in real-time and on the fly.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
    monitoring, using a dynamic real-time security and behavior analysis engine, a subset of all data input to an application on a mobile device and data output from the application, wherein the dynamic real-time security and behavior analysis engine is configured to encapsulate the application using an application wrapping technique in such a manner that processes of the application cannot detect the dynamic real-time security and behavior analysis engine and processes performed thereby;
    storing, by the dynamic real-time security and behavior analysis engine, meta-data, which describes (1) the monitored subset of all data input to the application and data output from the application and (2) performance characteristics of the application, on the mobile device;
    determining, by the dynamic real-time security and behavior analysis engine, whether a behavior of the application is anomalous based on a comparison of real-time meta-data to historical meta-data stored on the mobile device, wherein the historical metadata describes normal application operation performance characteristics of the application while executing on other mobile devices;
    in response to determining that the behavior of the application is anomalous, initiating enhanced monitoring to monitor all data input to the application and data output from the application on the mobile device, wherein the enhanced monitoring comprises recording video of all actions taken on the mobile device and diagnosing a cause of the anomalous behavior based at least in part on the enhanced monitoring;
    in response to determining, based on the data input to and output from the application received in the enhanced monitoring mode, that a particular application is requesting a resource that the particular application has never accessed before, determining a risk level associated with the particular application accessing the resource based on (1) performance history of the particular application, (2) a sensitivity of the resource, and (3) an importance of the resource; and
    determining whether the particular application should be granted full, restricted, or any access to the resource based on the risk level.

2. The method of claim 1, wherein determining whether the behavior of the application is anomalous based on the meta-data stored on the mobile device includes:
    determining whether the behavior of the application deviates from a baseline level by a predetermined amount or greater; and
    determining that the behavior of the application is anomalous in response to determining that the behavior of the application deviates from the baseline level by the predetermined amount or greater.

3. The method of claim 2,
    wherein the behavior of the application corresponds to an amount of processor capacity utilized by the application,
    wherein the baseline level corresponds to an average amount of processor capacity utilized by a plurality of applications similar to the application, and
    wherein the predetermined amount is a deviation of about 30%.

4. The method of claim 1, further comprising:
    providing the meta-data to the other device;
    receiving feedback data from the other device, the feedback data indicating whether the behavior of the application is anomalous based on the meta-data; and
    providing the detailed data to the other device in response to receiving feedback data indicating that the behavior of the application is anomalous based on the meta-data.

5. The method of claim 1, further comprising:
    injecting the dynamic real-time security and behavior analysis engine into the application using the application wrapping technique.

6. The method of claim 1, further comprising:
    providing the meta-data to the other device; and
    receiving feedback data from the other device, the feedback data indicating a baseline level for the behavior of the application,
    wherein determining whether the behavior of the application is anomalous based on the meta-data stored on the mobile device includes:
        determining whether the behavior of the application deviates from the baseline level by a predetermined amount or greater; and
        determining that the behavior of the application is anomalous in response to determining that the behavior of the application deviates from the baseline level by the predetermined amount or greater.

7. The method of claim 1, further comprising:
    receiving feedback data from the other device, the feedback data indicating whether the behavior of the application is anomalous based on the detailed data; and
    restricting the application's access to a resource in response to receiving feedback data indicating that the behavior of the application is anomalous based on the detailed data.

8. A system comprising:
    a dynamic real-time security and behavior analysis engine configured to encapsulate an application on a mobile device using an application wrapping technique in such a manner that processes of the application cannot detect the dynamic real-time security and behavior analysis engine and processes controlled thereby;

a monitoring device configured to be controlled by the dynamic real-time security and behavior analysis engine to monitor a subset of all data input to the application and data output from the application;

a memory of the mobile device configured to be controlled by the dynamic real-time security and behavior analysis engine to store meta-data, which describes (1) the monitored subset of all data input to the application and data output from the application and (2) performance characteristics of the application;

a determining device configured to be controlled by the dynamic real-time security and behavior analysis engine to determine whether a behavior of the application is anomalous based on a comparison of real-time meta-data to historical meta-data stored on the mobile device, wherein the historical metadata describes normal application operation performance characteristics of the application while executing on other mobile devices;

the determining device further configured to, in response to determining that the behavior of the application is anomalous, initiate enhanced monitoring to monitor all data input to the application and data output from the application on the mobile device, wherein the enhanced monitoring comprises recording video of all actions taken on the mobile device and diagnosing a cause of the anomalous behavior based at least in part on the enhanced monitoring;

the determining device further configured to, in response to determining, based on the data input to and output from the application received in the enhanced monitoring mode, that a particular application is requesting a resource that the particular application has never accessed before, determine a risk level associated with the particular application accessing the resource based on (1) performance history of the particular application, (2) a sensitivity of the resource, and (3) an importance of the resource; and the determining device further configured to determine whether the particular application should be granted full, restricted, or any access to the resource based on the risk level.

9. The system according to claim 8, wherein the determining device is configured to:
   determine whether the behavior of the application deviates from a baseline level by a predetermined amount or greater; and
   determine that the behavior of the application is anomalous in response to determining that the behavior of the application deviates from the baseline level by the predetermined amount or greater.

10. The system according to claim 9,
    wherein the behavior of the application corresponds to an amount of processor capacity utilized by the application,
    wherein the baseline level corresponds to an average amount of processor capacity utilized by a plurality of applications similar to the application, and
    wherein the predetermined amount is a deviation of about 30%.

11. The system according to claim 8,
    wherein the output device is further configured to provide the meta-data to the other device,
    wherein the system further comprises a receiving device configured to receive feedback data from the other device, the feedback data indicating whether the behavior of the application is anomalous based on the meta-data, and
    wherein the output device is further configured to provide the detailed data to the other device in response to receiving feedback data indicating that the behavior of the application is anomalous based on the meta-data.

12. The system according to claim 8,
    wherein the application is configured to receive the dynamic real-time security and behavior analysis engine injected thereinto via the application wrapping technique.

13. The system according to claim 8,
    wherein the output device is further configured to provide the meta-data to the other device,
    wherein the system further comprises a receiving device configured to receive feedback data from the other device, the feedback data indicating a baseline level for the behavior of the application,
    wherein the determining device is configured to:
      determine whether the behavior of the application deviates from the baseline level by a predetermined amount or greater; and
      determine that the behavior of the application is anomalous in response to determining that the behavior of the application deviates from the baseline level by the predetermined amount or greater.

14. The system according to claim 8, further comprising:
    a receiving device configured to receive feedback data from the other device, the feedback data indicating whether the behavior of the application is anomalous based on the detailed data; and
    an enforcement device configured to restrict the application's access to a resource in response to receiving feedback data indicating that the behavior of the application is anomalous based on the detailed data.

15. A non-transitory computer program product comprising:
    a non-transitory computer readable storage medium having computer readable program code embodied therewith, the computer readable program code comprising:
      computer readable program code embodying a dynamic real-time security and behavior analysis engine that encapsulates an application on a mobile device using an application wrapping technique in such a manner that processes of the application cannot detect the dynamic real-time security and behavior analysis engine and processes of the dynamic real-time security and behavior analysis engine, wherein the processes of the dynamic real-time security and behavior analysis engine are embodied by:
      computer readable program code configured to monitor a subset of all data input to the application and data output from the application on a mobile device;
      computer readable program code configured to store meta-data, which describes (1) the monitored subset of all data input to the application and the data output from the application and (2) performance characteristics of the application, on the mobile device;
      computer readable program code configured to determine whether a behavior of the application is anomalous based on a comparison of real-time meta-data to historical meta-data stored on the mobile device, wherein the historical metadata describes normal application operation performance characteristics of the application while executing on other mobile devices;

computer readable program code configured to, in response to determining that the behavior of the application is anomalous, initiate enhanced monitoring to monitor all data input to the application and data output from the application on the mobile device, wherein the enhanced monitoring comprises recording video of all actions taken on the mobile device and diagnosing a cause of the anomalous behavior based at least in part on the enhanced monitoring;

computer readable program code configured to, in response to determine, based on the data input to and output from the application received in the enhanced monitoring mode, that a particular application is requesting a resource that the particular application has never accessed before, determining a risk level associated with the particular application accessing the resource based on (1) performance history of the particular application, (2) a sensitivity of the resource, and (3) an importance of the resource; and computer readable program code configured to determine whether the particular application should be granted full, restricted, or any access to the resource based on the risk level.

16. The non-transitory computer program product of claim 15, wherein the computer readable program code configured to determine whether the behavior of the application is anomalous based on the meta-data stored on the mobile device comprises:

computer readable program code configured to determine whether the behavior of the application deviates from a baseline level by a predetermined amount or greater; and computer readable program code configured to determine that the behavior of the application is anomalous in response to determining that the behavior of the application deviates from the baseline level by the predetermined amount or greater.

17. The non-transitory computer program product of claim 16, wherein the behavior of the application corresponds to an amount of processor capacity utilized by the application, wherein the baseline level corresponds to an average amount of processor capacity utilized by a plurality of applications similar to the application, and wherein the predetermined amount is a deviation of about 30%.

18. The non-transitory computer program product of claim 15, wherein the processes of the dynamic real-time security and behavior analysis engine are further embodied by:

computer readable program code configured to provide the meta-data to the other device;

computer readable program code configured to receive feedback data from the other device, the feedback data indicating whether the behavior of the application is anomalous based on the meta-data; and computer readable program code configured to provide the detailed data to the other device in response to receiving feedback data indicating that the behavior of the application is anomalous based on the meta-data.

19. The non-transitory computer program product of claim 15, wherein the computer readable program code embodied therewith the non-transitory computer readable storage medium further comprises:

computer readable program code configured to inject the dynamic real-time security and behavior analysis engine into the application using the application wrapping technique.

20. The non-transitory computer program product of claim 15, wherein the processes of the dynamic real-time security and behavior analysis engine are further embodied by:

computer readable program code configured to provide the meta-data to the other device, computer readable program code configured to receive feedback data from the other device, the feedback data indicating a baseline level for the behavior of the application, and wherein the computer readable program code configured to determine whether the behavior of the application is anomalous based on the meta-data stored on the mobile device comprises:

computer readable program code configured to determine whether the behavior of the application deviates from the baseline level by a predetermined amount or greater; and computer readable program code configured to determine that the behavior of the application is anomalous in response to determining that the behavior of the application deviates from the baseline level by the predetermined amount or greater.

* * * * *